United States Patent
Pepe, Jr. et al.

(10) Patent No.: US 10,726,254 B2
(45) Date of Patent: Jul. 28, 2020

(54) DYNAMIC DUPLICATE DETECTION

(71) Applicant: Bank of America Corporation, Charlotte, NC (US)

(72) Inventors: Michael J. Pepe, Jr., Wilmington, DE (US); Kerry Kurt Simpkins, Fort Mill, SC (US); John Barrett Hall, Charlotte, NC (US); Robert E. Mills, Jr., Stockbridge, GA (US); Murali Santhanam, Naperville, IL (US)

(73) Assignee: Bank of America Corporation, Charlotte, NC (US)

( * ) Notice: Subject to any disclaimer, the term of this patent is extended or adjusted under 35 U.S.C. 154(b) by 95 days.

(21) Appl. No.: 15/923,094

(22) Filed: Mar. 16, 2018

(65) Prior Publication Data

US 2019/0286900 A1    Sep. 19, 2019

(51) Int. Cl.
*G06K 9/00* (2006.01)
*G06Q 10/10* (2012.01)
*G06T 7/00* (2017.01)
*G06T 7/11* (2017.01)
*G06T 7/73* (2017.01)

(52) U.S. Cl.
CPC ........ *G06K 9/00483* (2013.01); *G06T 7/0002* (2013.01); *G06T 2207/30176* (2013.01)

(58) Field of Classification Search
None
See application file for complete search history.

(56) References Cited

U.S. PATENT DOCUMENTS

| | | | |
|---|---|---|---|
| 8,254,658 B2 | 8/2012 | Hamilton | |
| 8,793,191 B2 | 7/2014 | Abernethy et al. | |
| 9,092,447 B1* | 7/2015 | Anderson | G06Q 20/3827 |
| 9,218,701 B2 | 12/2015 | Cantley et al. | |
| 9,317,745 B2* | 4/2016 | Smith | G06K 9/00469 |
| 9,384,393 B2 | 7/2016 | Smith et al. | |
| 9,626,724 B2 | 4/2017 | Tatham et al. | |
| 10,242,277 B1* | 3/2019 | Manohar | G06K 9/036 |
| 2003/0231785 A1* | 12/2003 | Rhoads | G06F 21/10 382/100 |
| 2004/0128656 A1* | 7/2004 | Yamagata | G06T 3/00 717/136 |

* cited by examiner

*Primary Examiner* — Soo Shin
(74) *Attorney, Agent, or Firm* — Banner & Witcoff, Ltd.; Michael A. Springs

(57) ABSTRACT

Systems for dynamically detecting duplicate items are provided. In some examples, a system, may receive a document, document image, document details or the like. The system may identify at least one other document for comparison to the received document. The system may perform optical character recognition on the document or document image to identify data within one or more standard fields of the document. The detected data may be compared to the at least one other document and, if no matches exist, the document may be identified as not a duplicate. If one or more matches exist, the system may identify x and y coordinates of a location of data within one or more standard fields on the received document. A corresponding location on the at least one other document may be identified based on the x and y coordinates. A comparison of data at the location on the received document to data at the location on the at least one other document may be performed and, if a match exists, the received document may be identified as a duplicate.

21 Claims, 11 Drawing Sheets

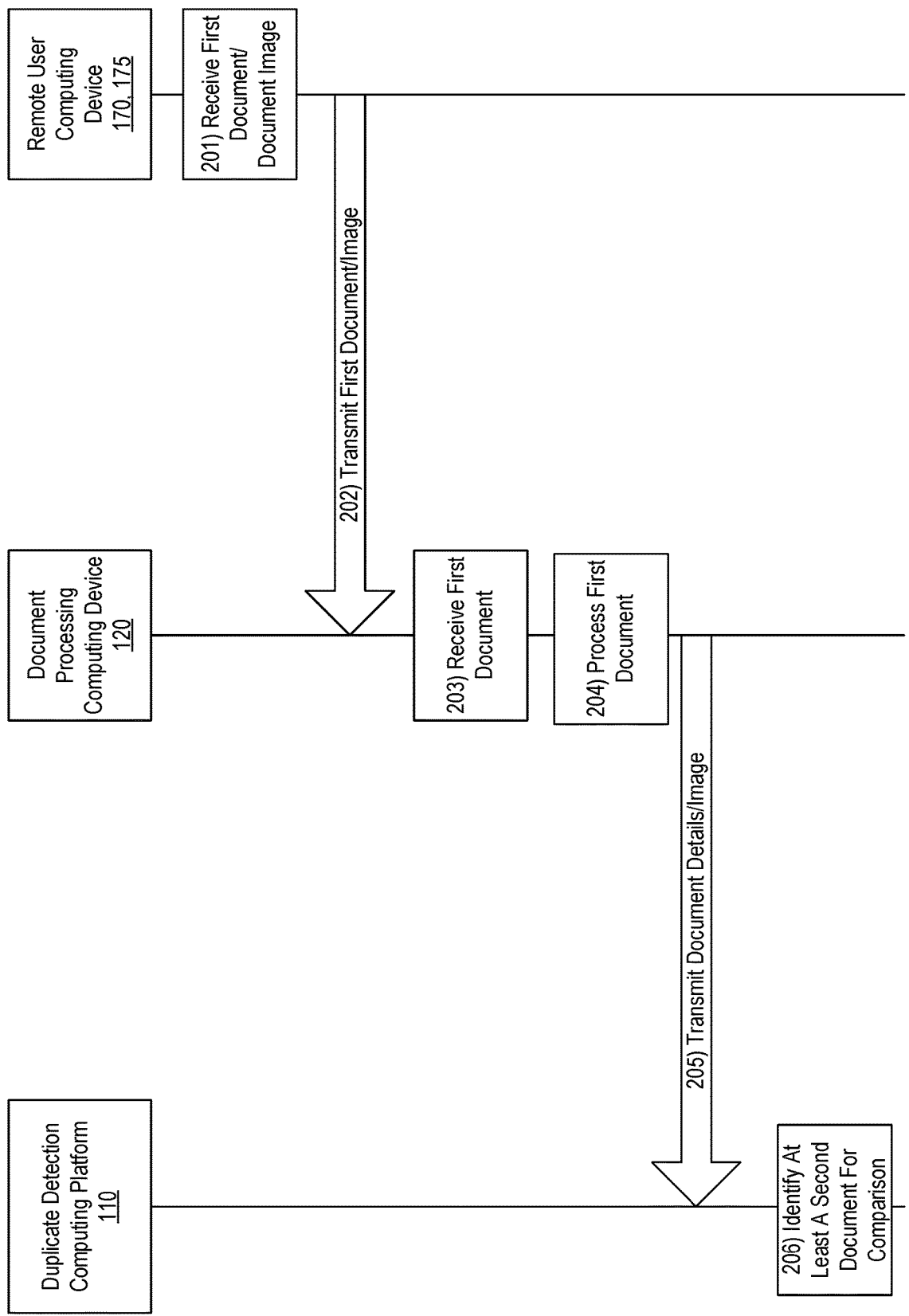

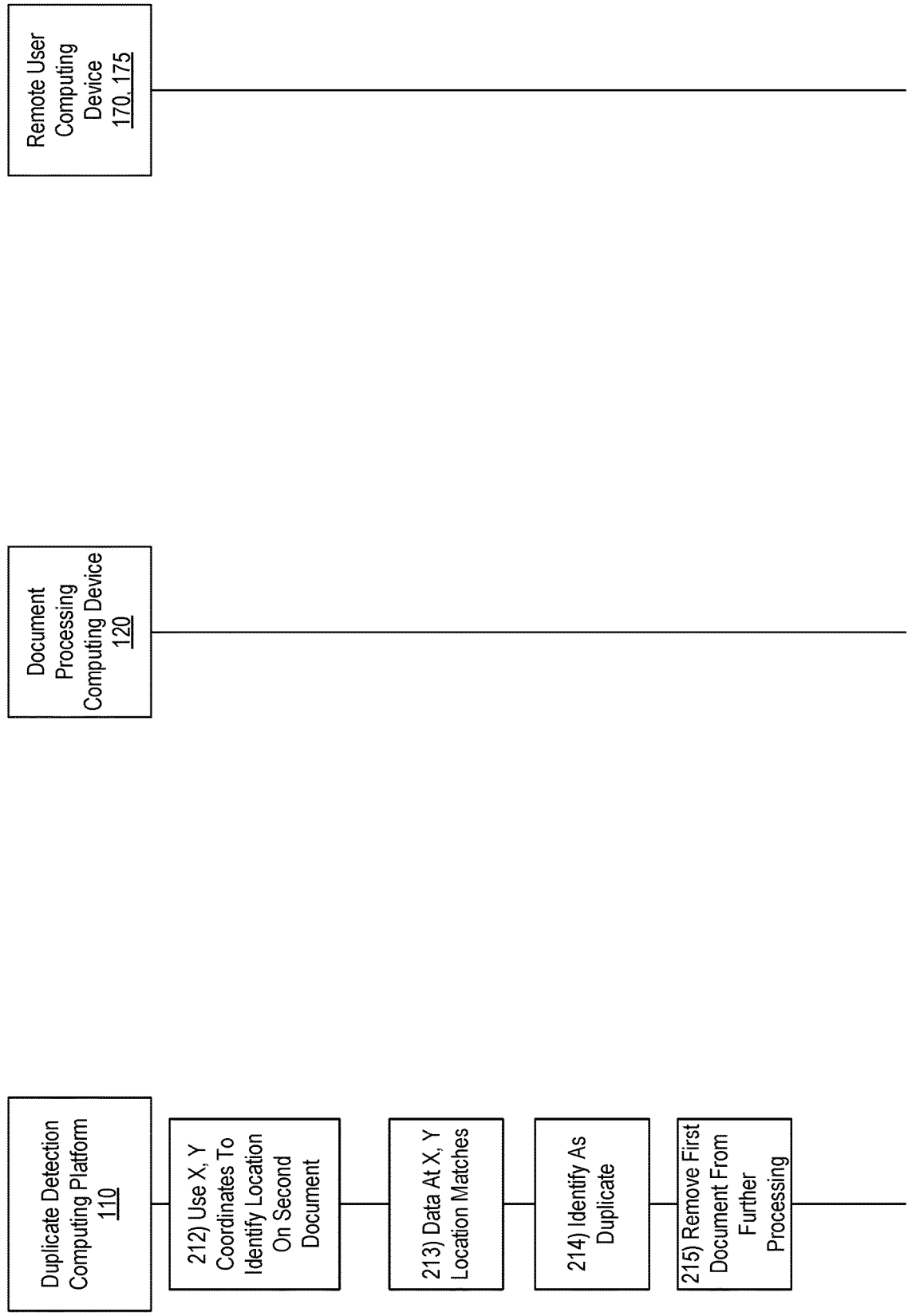

NAME
ADDRESS    DATE _____ 402    YYY

400 →

PAYEE: __406_____    $ [    ] 404
_____ DOLLARS

MEMO __408_____    _____
XXXXXXXX   XXXXXXXXX

NAME
ADDRESS    DATE MM/DD/YYYY    YYY

510

PAYEE: □COMPANY 1_____    $ [ 27.42 ]
TWENTY SEVEN AND 42/100    DOLLARS

MEMO _____    _____
XXXXXXXX   XXXXXXXXX

NAME
ADDRESS    DATE MM/DD/YYYY    YYY

560

PAYEE: □  COMPANY 1_____    $ [ 27.42 ]
TWENTY SEVEN AND 42/100    DOLLARS

MEMO _____    _____
XXXXXXXX   XXXXXXXXX

FIG. 5B

DYNAMIC DUPLICATE DETECTION

BACKGROUND

Aspects of the disclosure relate to electrical computers, systems, and devices. In particular, one or more aspects of the disclosure relate to dynamically detecting duplicate items.

Accuracy in processing documents, items or instruments, such as checks, is important. Currently, requests to process documents are often received via various channels. For instance, requests to process documents may be received via a mobile device (e.g., by capturing an image of the document), via an online system, through an in person event, or the like. Accordingly, as documents are received through various different channels, it is increasingly complicated and labor intensive to review each document and compare it to previously received documents in order to determine whether the received document is a duplicate. While some conventional systems provide for comparing data in two documents to determine whether the data matches, these systems are often inaccurate and inefficient. In some cases those conventional systems lead to excessive use of computing resources and manual resources. Accordingly, it would be advantageous to provide a system, device, or the like, to accurately and efficiently evaluate documents to detect duplicate documents.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, accurate, scalable, and convenient technical solutions that address and overcome the technical problems associated with detecting duplicate documents, items, instruments, or the like.

In some examples, a system, computing platform, or the like, may receive a document, document image, document details or the like. In some examples, the document may be received from a remote user computing device, such as a mobile device of a user, automated teller machine, or the like. In some arrangements, the document may be initially processed by a document processing computing device and transmitted to a duplicate detection computing platform.

In some examples, the duplicate detection computing platform may identify at least one other document for comparison to the received document. The duplicate detection computing platform may perform optical character recognition on the document or document image to identify data within one or more standard fields of the document. The detected data may be compared to the at least one other document and, if no matches exist, the document may be identified as not a duplicate. If one or more matches exist, the duplicate detection computing platform may identify x and y coordinates of a location of data within one or more standard fields on the received document. A corresponding location on the at least one other document may be identified based on the x and y coordinates. A comparison of data at the location on the received document to data at the location on the at least one other document may be performed and, if a match exists, the received document may be identified as a duplicate.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for implementing dynamic duplicate detection functions in accordance with one or more aspects described herein;

FIG. 4 illustrates one example document having a plurality of standard fields, according to one or more aspects described herein;

FIGS. 5A and 5B illustrate example documents being compared to detect a potential duplicate document, according to one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to dynamically detecting duplicate documents using optical character recognition and other systems.

As mentioned above, efficiently and accurately detecting duplicate documents, including documents for deposit such as checks, and the like is an important aspect of many businesses. Some entities receive millions or even billions of documents, including documents for deposit such as checks, and the like, in the course of year. Evaluating each document to determine whether it is a duplicate of an item already received is time consuming, labor intensive, inefficient can lead to inaccuracies.

Accordingly, arrangements described herein include systems using optical character recognition to evaluate documents, determine whether a duplicate exists and either process the document (e.g., cash the check, deposit the check, or the like) or remove the document from further processing. In some examples, the system may perform an initial evaluation in which data in standard fields in a received document is compared to corresponding fields in at least one other document. For instance, the in case of a check, the amount, payee, date, check number, or the like, may be compared to corresponding fields on at least one other document to determine whether any of the data items match. If no matches exists (or less than a threshold number of matches exist) the document may be identified as not a duplicate and further processed.

Alternatively, if data in one or more standard fields on the first document matches data in a corresponding field on the at least a second document, additional evaluation may be performed. For instance, optical character recognition may be used to determine x and y coordinates of a location of data within one or more fields of the standard fields on the received document. A corresponding location on the at least one other document may be identified and data at the location may be compared to data at the location on the received document. If a match exists, the document is a duplicate and may be removed from further processing. If a match does not exist, the document may be further processed.

These and various other arrangements will be discussed more fully below.

Figure 1A:
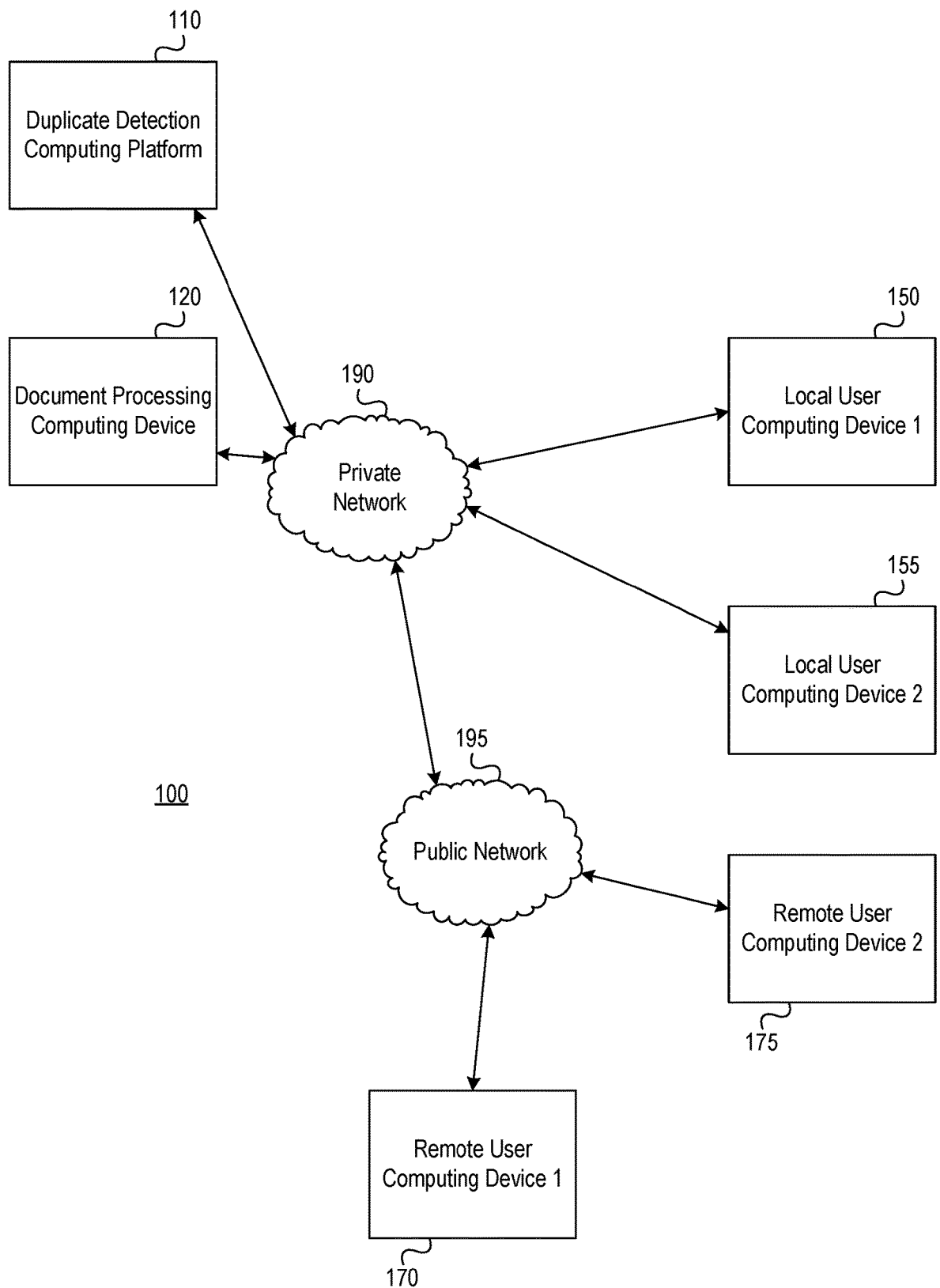
FIGS. 1A and 1B depict an illustrative computing environment for implementing dynamic duplicate detection functions in accordance with one or more aspects described herein.
Figure 1B:
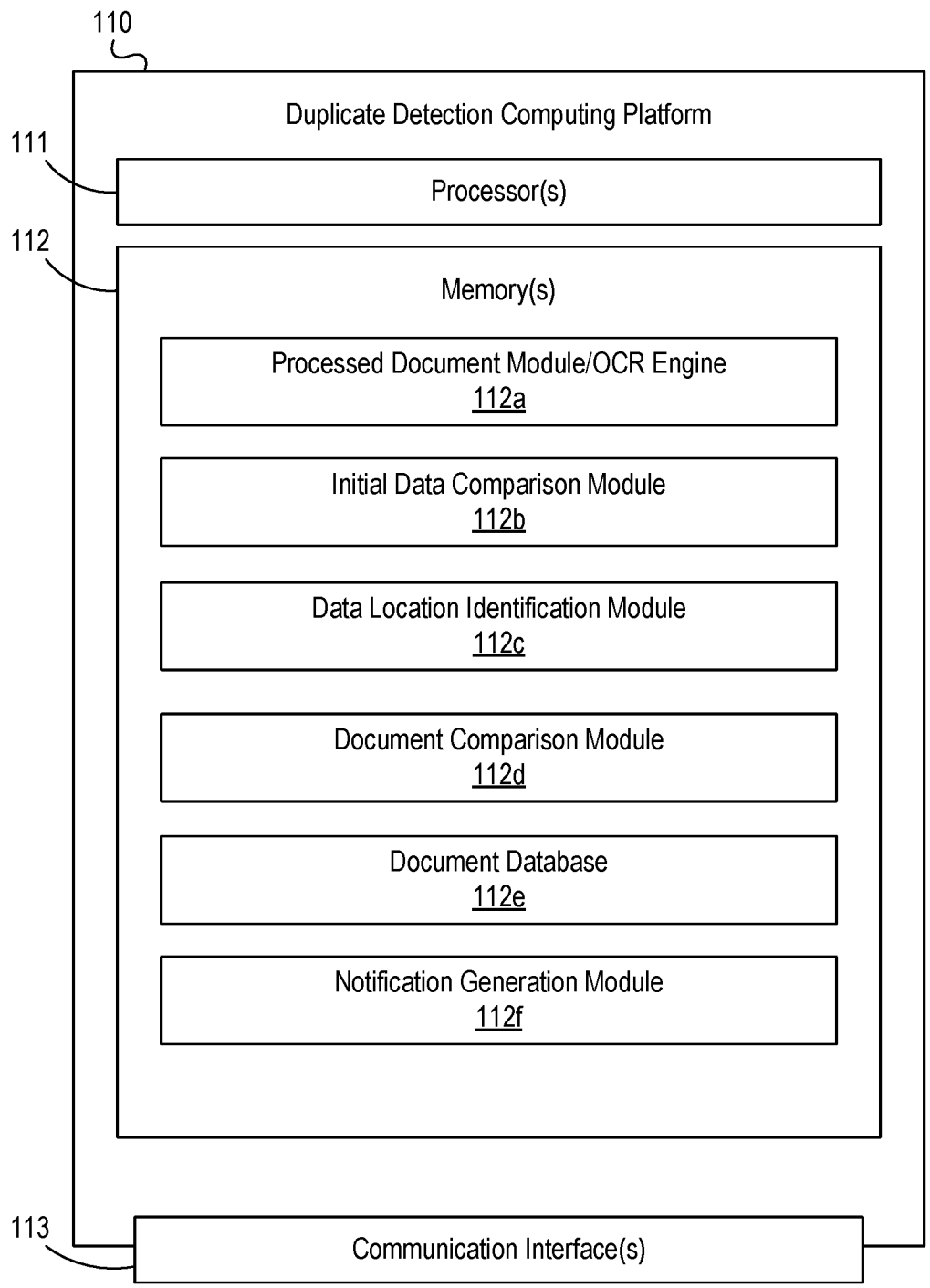

FIGS. 1A and 1B depict an illustrative computing environment for implementing and using a system for dynamically detecting and processing duplicate documents in accordance with one or more aspects described herein. Referring to FIG. 1A, computing environment 100 may include one or more computing devices and/or other computing systems. For example, computing environment 100 may include a duplicate detection computing platform 110, document processing computing device 120, a first local user computing device 150, a second local user computing device 155, a first remote user computing device 170, and a second remote user computing device 175.

Duplicate detection computing platform 110 may be configured to provide dynamic duplicate detection functions. In some examples, a document or document image, details or the like, may be received (e.g., from document processing computing device 120, remote user computing device 170, 175, or the like). The document may include a plurality of standard fields. For instance, the document may have a first document type having a plurality of standard fields associated with the first document type. In some examples, the document may be a check having standard fields such as payee, amount, memo, signature, and the like. In some examples, the document may be compared to one or more other documents (e.g., if the document is a check, the check may be compared to one or more other checks received by the duplicate detection computing platform 110) to determine whether the document is a duplicate of one or more other documents previously processed by the duplicate detection computing platform 110. In some examples, the document may be compared to all documents received within a predetermined time period (e.g., last one week, last one month, last 30 days, last 90 days, or the like).

In some arrangements, comparing the document to the one or more other documents may include using optical character recognition (OCR) to determine an amount, payee name, and the like. This information may be used to attempt to make a preliminary or initial determination as to whether the document is a duplicate. In some examples, confidence ratings may be used. Accordingly, if a low confidence rating is associated with the potential duplicate, or detected data is not sufficiently decipherable to determine whether a duplicate exists, or the like, OCR may be used to determine x and y coordinates of data in one or more other standard fields. The x and y coordinates may indicate a location of an edge or start of data (or other portion of the data) input into the one or more standard fields. The x and y coordinates may then be applied or translated to the one or more other documents to determine whether the x and y coordinates also correspond to the same or similar data input into the one or more standard fields in the document for comparison. If so, a duplicate may be detected and flagged (e.g., removed from further processing, notification generated and transmitted, and the like).

Document processing computing device 120 may include hardware and/or software configured to receive a document, document image, document details, and the like, and process the document. In some examples, the document may be received by a remote user computing device (e.g., first remote user computing device 170, second remote user computing device 175, or the like) which may be a mobile device of a user, automated teller machine (ATM) or other self-service kiosk, or the like. The document processing computing device 120 may capture an image of the document, store an image (either temporarily or transmit the image for long term storage) and the like. In some examples, the document processing computing device 120 may be part of the remote user computing device 170, 175, e.g., may be part of the mobile device of the user, ATM, or the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to control or implement aspects of the functions performed by duplicate detection computing platform 110, to establish rules for processing documents, enable manual review of documents identified as unreadable or requiring additional processing, and the like.

The remote user computing devices 170, 175 may be used to communicate with, for example, duplicate detection computing platform 110, transmit documents, document images, document data, and the like, receive notifications, display notifications, and the like. As discussed above, the remote user computing devices 170, 175, may be various types of devices, such as a mobile device of a user (e.g., smartphone, tablet or the like), ATM, self-service kiosk, or the like.

In one or more arrangements document processing computing device 120, local user computing device 150, local user computing device 155, remote user computing device 170, and/or remote user computing device 175 may be any type of computing device or combination of devices capable of performing the particular functions described herein. For example, document processing computing device 120, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of document processing computing device 120, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include duplicate detection computing platform 110. As illustrated in greater detail below, duplicate detection computing platform 110 may include one or more computing devices configured to perform one or more of the functions described herein. For example, duplicate detection computing platform 110 may include one or more computers (e.g., laptop computers, desktop computers, servers, server blades, or the like).

As mentioned above, computing environment 100 also may include one or more networks, which may interconnect one or more of duplicate detection computing platform 110, document processing computing device 120, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like).

Private network 190 may be associated with a particular organization (e.g., a corporation, financial institution, educational institution, governmental institution, or the like) and may interconnect one or more computing devices associated with the organization. For example, duplicate detection computing platform 110, document processing computing device 120, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect duplicate detection computing platform 110, document processing computing device 120, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., duplicate detection computing platform 110, document processing computing device 120, local user computing device 150, local user computing device 155) with one or more networks and/or computing devices that are not associated with the organization. For example remote user computing device 170, and/or remote user computing device 175 might not be associated with an organization that operates private network 190 (e.g., because remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the internet) that connect remote user computing device 170 and remote user computing device 175 to private network 190 and/or one or more computing devices connected thereto (e.g., duplicate detection computing platform 110, document processing computing device 120, local user computing device 150, local user computing device 155).

Referring to FIG. 1B, duplicate detection computing platform 110 may include one or more processors 111, memory 112, and communication interface 113. A data bus may interconnect processor(s) 111, memory 112, and communication interface 113. Communication interface 113 may be a network interface configured to support communication between duplicate detection computing platform 110 and one or more networks (e.g., private network 190, public network 195, or the like). Memory 112 may include one or more program modules having instructions that when executed by processor(s) 111 cause duplicate detection computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of duplicate detection computing platform 110 and/or by different computing devices that may form and/or otherwise make up duplicate detection computing platform 110.

For example, memory 112 may have, store, and/or include a processed document module/OCR engine 112a. Processed document module/OCR engine 112a may store instructions and/or data that may cause or enable the duplicate detection computing platform 110 to receive a processed document, document image and/or document details from, for example, document processing computing device 120. As discussed herein, document processing computing device 120 may be part of a remote user computing device 170, 175 (e.g., mobile device of a user, ATM, or the like) or may be a separate computing device configured to receive a document and process it. Processed document module/OCR engine 112a may evaluate the processed document by performing optical character recognition (OCR) on the document. OCR may be used to identify data contained in standard fields within the document. For instance, if the document is a check, OCR may be used to identify an amount from an amount field, a payee from a payee field, a date from a date field, a signature from a signature field, or the like.

OCR may further be used, for example, by the processed document module/OCR engine 112a, to identify a location of data within one or more standard fields within the document. For instance, OCR may be used to determine x and y coordinates associated with a location of an edge or starting point of data input into one or more of the standard fields. For example, OCR may be used to determine a location of an edge or starting point of a payee name. This information may be compared to information in one or more other documents to determine whether a duplicate exists.

Processed document module/OCR engine 112a may further store instructions and/or data that may cause or enable the duplicate detection computing platform 110 to determine a confidence rating associated with each field for which OCR data is determined. For instance, OCR may be used to identify data in standard fields in a document such as a check. Processed document module/OCR engine 112a may determine a confidence rating associated with data detected in each field. The confidence rating may be an indication of data quality. For instance, the confidence rating may indicate accuracy of the OCR engine. For instance, if the document being evaluated has been folded, the paper has deteriorated, ink has smudged, or the like, the output from the OCR engine 112a may indicate a low confidence due to the poor quality of the document being evaluated. Alternatively, if the document is relatively new, includes clearly written information, and the like, the OCR engine 112a may have a high confidence in the accuracy of the OCR engine. The confidence rating may be determined for each field and/or may be an overall rating for the document.

Duplicate detection computing platform 110 may further have, store and/or include an initial data comparison module 112b. Initial data comparison module 112b may store instructions and/or data that may cause or enable the duplicate detection computing platform 110 to perform an initial comparison of a received document or document image, data or the like, to one or more other documents, such as one or more other documents previously received by the duplicate detection computing platform 110 that may be stored in, for example, document database 112e. In some examples, the initial comparison performed by the initial data comparison module 112b may include comparing data determined using OCR, such as a payee name, an amount, date, and the like. In some arrangements, this comparison may yield an initial determination that the received document is not a duplicate of another document previously received by the duplicate detection computing platform 110. In other examples, the comparison may be inconclusive or may yield an initial determination that the received document is a potential duplicate or a likely duplicate or another document previously received by the duplicate detection computing platform 110.

Duplicate detection computing platform 110 may further have, store and/or include data location identification module 112c. Data location identification module 112c may store instructions and/or data that may cause or enable the duplicate detection computing platform 110 to identify a location on one or more previously received and/or stored documents corresponding to x and y coordinates determined from the received document being analyzed.

Duplicate detection computing platform 110 may further have, store and/or include a document comparison module 112d. Document comparison module 112d may store instructions and/or data that may cause or enable the duplicate detection computing platform 110 to analyze data at a location of determined x and y coordinates on the received document and the identified corresponding location determined by the data location identification module 112c. The document comparison module 112d may determine whether the data at the determined location on the received document corresponds to the data on one or more documents previously received and to which the document is being compared. For instance, if an edge or start of data within a standard field on the received document corresponds to an edge or start of data within the corresponding standard field on a previously received document, the document may be a duplicate.

As discussed above, duplicate detection computing platform 110 may further include a document database 112e. Document database 112e may store previously received and/or evaluated documents that may be compared to newly a newly received document. In some examples, document database 112e may store all documents received and/or evaluated by duplicate detection computing platform 110 for a previous time period (e.g., all documents received and/or evaluated within the last week, last 30 days, last 90 days, or the like).

Duplicate detection computing platform 110 may further have, store and/or include notification generation module 112f. Notification generation module 112f may store instructions and/or data that may cause or enable the duplicate detection computing platform 110 to generate one or more notifications, transmit the generated notification to a computing device, and cause the generated notification to display on the computing device.

Figure 2B:
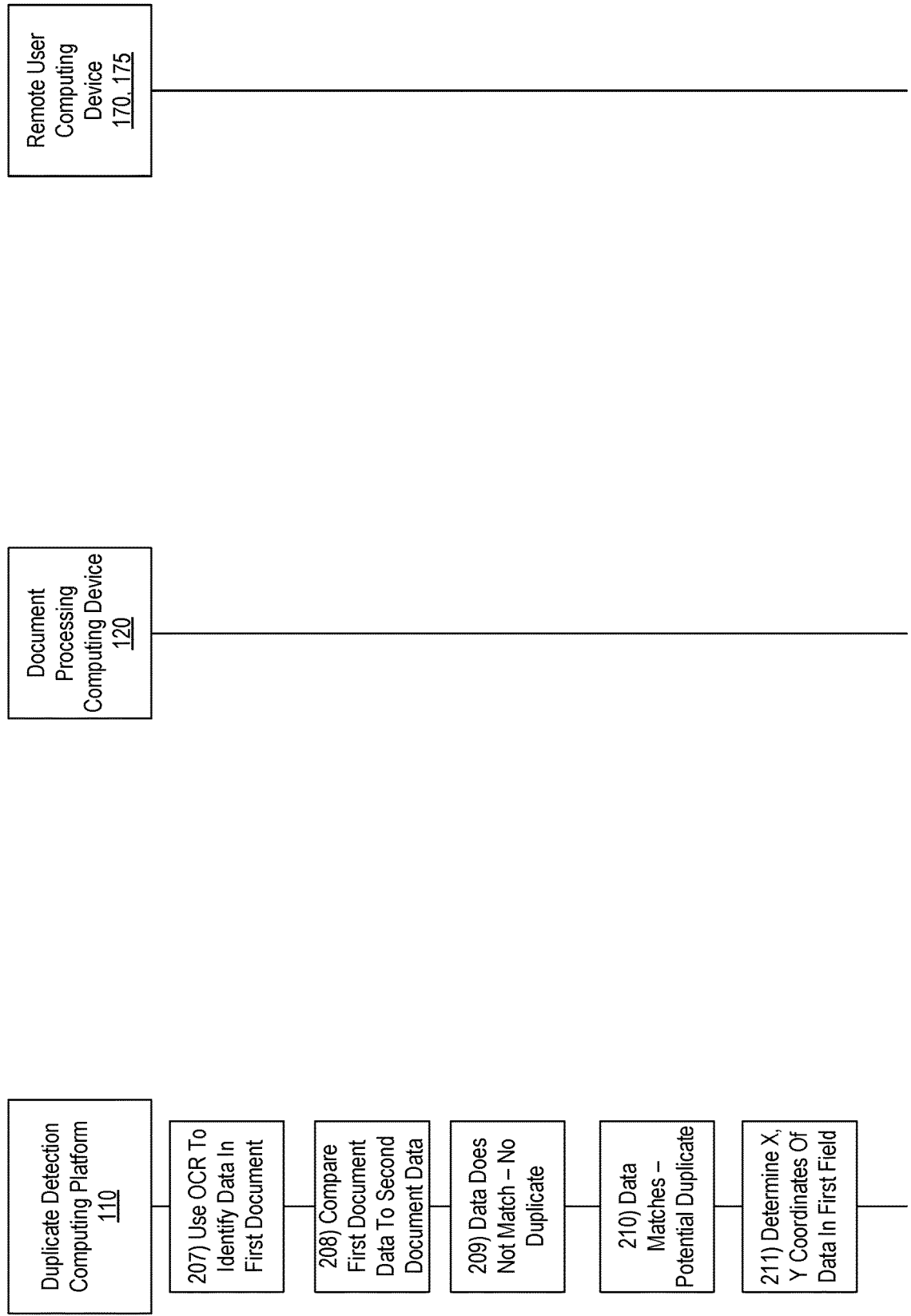

FIGS. 2A-2C depict an illustrative event sequence for implementing and using duplicate detection functions in accordance with one or more aspects described herein. The events shown in the illustrative event sequence are merely one example sequence and additional events may be added, or events may be omitted, without departing from the invention.

Referring to FIG. 2A, at step 201, a first document, document image, document details or the like, may be received. In some examples, the first document, document image, document details, or the like, may be received by a remote user computing device 170, 175. In some examples, the remote user computing device 170, 175 may be a mobile device of a user, personal computing device of a user, ATM, self-service kiosk, or the like. In some examples, the first document may be received via, for instance, an aperture in the remote user computing device 170, 175 (e.g., in the case of an ATM, self-service kiosk, or the like). In other examples, an image of the first document may be captured via an image capture device of the remote user computing device 170, 175. At step 202, the received first document, document image, document details, or the like may be transmitted to the document processing computing device 120. In examples in which the document processing computing device 120 is part of the remote user computing device 170, 175, the transmitting step may be omitted.

At step 203, the document processing computing device 120 may receive the first document. At step 204, the document processing computing device 120 may process the first document. For instance, the document processing computing device may capture an image of the first document (e.g., in examples in which a physical document is received via the remote user computing device 170, 175), identify a type of document, or the like.

At step 205, the processed first document or document image, as well as any additional details associated with the document, may be transmitted to the duplicate detection computing platform 110. At step 206, the first document may be received and at least one second document may be identified for comparison. For instance, one or more other document previously received by the duplicate detection computing platform 110 may be identified for comparison to the first document to determine whether the first document is a duplicate. In some examples, the one or more other documents may include all documents receive during a predetermined time period (e.g., a preceding week, an immediately preceding 30 days, or the like).

With reference to FIG. 2B, at 207, optical character recognition (OCR) may be used to identify data within the first document. For instance, if the first document is a check, OCR may be used to determine data in standard fields such as amount, payee, date, signature, memo, or the like. In some examples, a confidence rating associated with the accuracy of the OCR output may be generated. This information may be used in evaluating a likelihood of a potential duplicate being an actual duplicate. In some examples, OCR may be used to identify a pixel location (e.g., x and y coordinates of a pixel location) of input data within a standard field.

At step 208, the first document may be compared to the at least a second document identified for comparison. Comparing the first document to the at least a second document may include comparing data from standard fields in the document. For instance, if the first document is a check, an amount, payee name, date and/or check number may be compared to the at least a second document.

At step 209, if, based on the comparison, a match does not exist between data in one or more fields, the document may be identified as likely not a duplicate. In some examples, the document may then be processed (e.g., may be deposited, cashed, or the like). In some examples, a confidence rating associated with the data in the first document may be considered in the comparison. For instance, if a match does not exist but the confidence rating is below a predetermined threshold, the document may be flagged for manual evaluation (e.g., a second, manual review to determine whether the document is a duplicate). Alternatively, if the confidence rating is above the threshold, the document may be identified as not a duplicate and processed.

At step 210, if data in one or more standard fields does match, the first document may be identified as a potential duplicate and additional evaluation or processing of the first document may be performed. For instance, at step 211, the x and y coordinates of a pixel location associated with an edge or starting point of data input into one or more standard fields may be identified (e.g., during the OCR process, in a second OCR process, or the like). For example, x and y coordinates of a pixel location associated with an edge or starting point of a payee name may be determined. Similar determinations may be made for data in other standard fields (e.g., amount, signature, memo, or the like).

With reference to FIG. 2C, at step 212, the determined x and y coordinates may be used to identify a corresponding location on the at least a second document. The data at the corresponding location on the at least a second document may be compared to the data at the location on the first document to determine whether a match exists at step 213. For instance, if the x and y location data in the first document matches data in the corresponding location on the at least a second document, a duplicate may exist.

At step 214, if a match exists, the first document may be identified as a duplicate of the at least a second document. In some examples, the confidence rating may be used in the identification of the first document as a duplicate. For instance, if a match exists and a confidence rating is above a predetermined threshold, the document may be identified as a duplicate. If a match exists, but the confidence rating is a below the predetermined threshold, the first document may be flagged for further evaluation (e.g., manual review).

If the document is identified as a duplicate, at step 215, the first document may be removed from further processing. For instance, if the first document is a check that accompanied a request to cash or deposit the check, the check will not be cashed or deposited and instead will be removed from further processing.

Figure 2D:
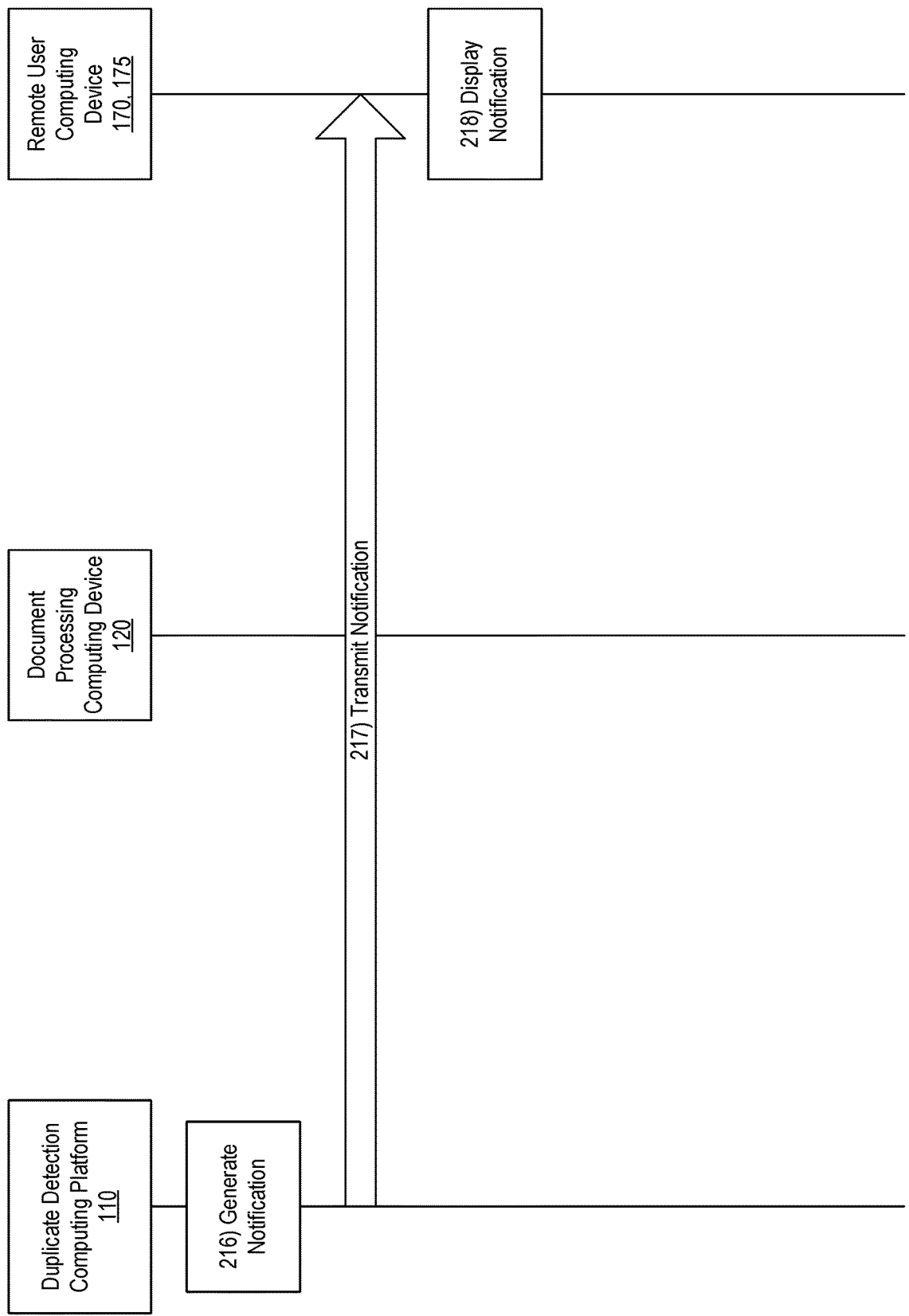

With reference to FIG. 2D, at step 216, a notification may be generated indicating that the document is being removed from further processing. At step 217, the generated notification may be transmitted to the remote user computing device 170, 175. At step 218, the notification may be displayed on the remote user computing device 170, 175.

Figure 3A:
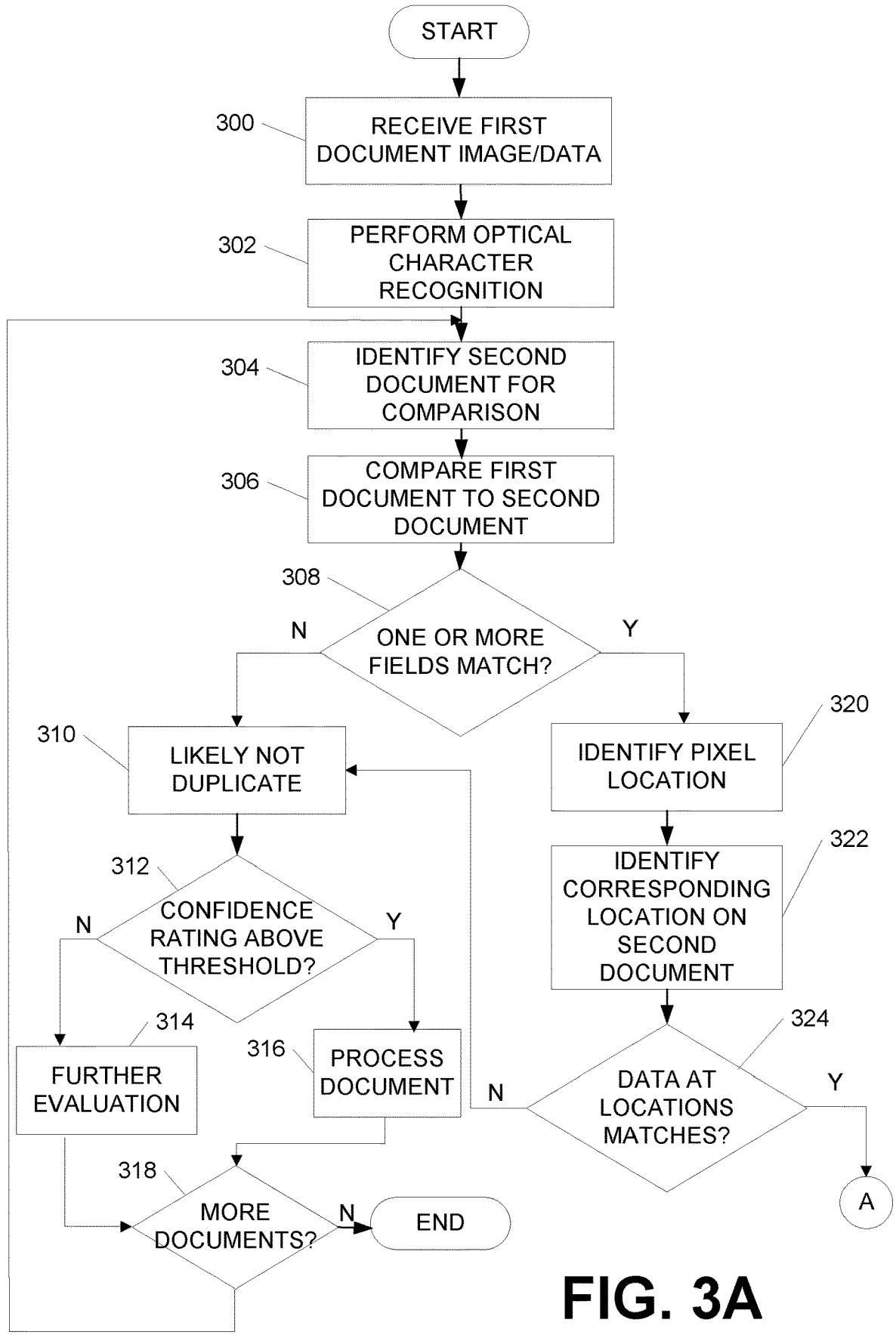
FIGS. 3A and 3B depict an illustrative method for implementing and using a system to perform dynamic duplicate detection functions, according to one or more aspects described herein.
Figure 3B:
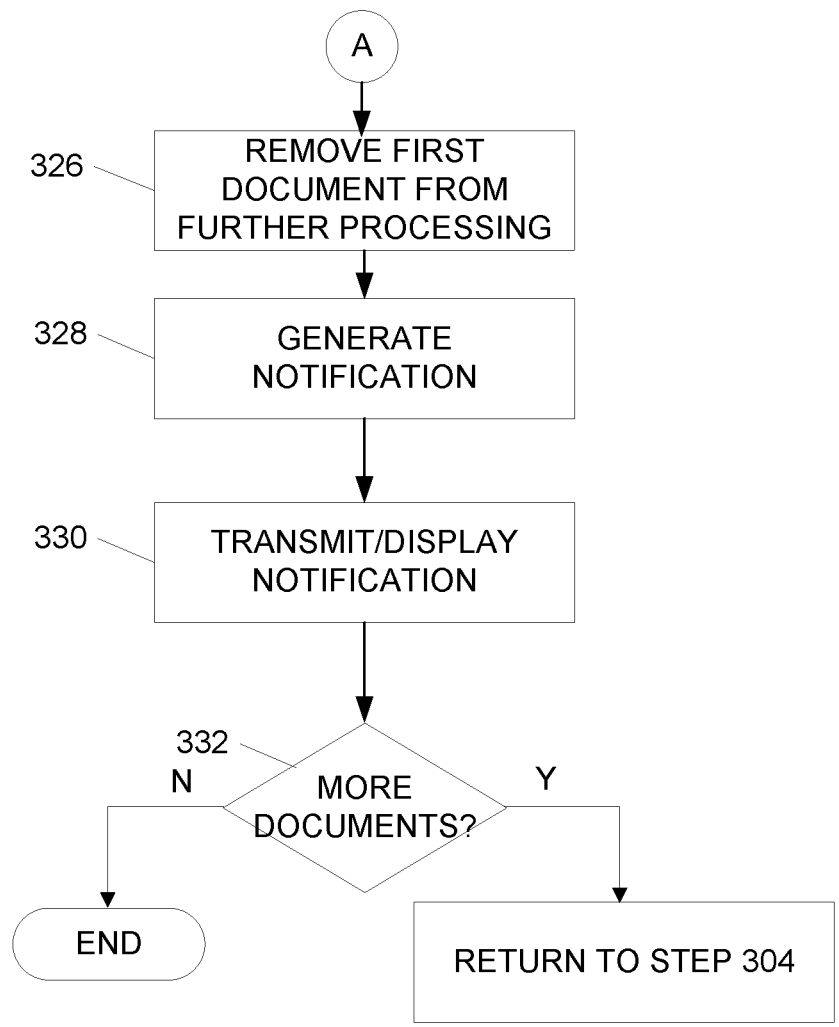

FIGS. 3A and 3B are a flow chart illustrating one example method of implementing dynamic duplicate detection functions according to one or more aspects described herein. The processes illustrated in FIGS. 3A and 3B are merely some example processes and functions. The steps shown may be performed in a different order, more steps may be added, or one or more steps may be omitted without departing from the invention.

In step 300, a first document or document image may be received. As discussed herein, the first document or document image may be received by a duplicate detection computing platform 110. At step 302, optical character recognition (OCR) may be used to identify data within one or more standard fields associated with the first document. For instance, the first document may be a first type of document having a plurality of standard fields. Accordingly, in detecting duplicates, the standard fields of the first document may be compared to the same standard fields found in other documents of the first type.

At step 304, a second or subsequent document may be identified for comparison. For instance, in some examples, the first document may be compared to all documents of the first document type received (e.g., by the duplicate detection computing platform) within a predetermined time period (e.g., previous week, previous 30 days, or the like). Accordingly, at step 304, a second document may be identified for comparison.

At step 306, the first document may be compared to the second document. In some examples, that may include comparing data (e.g., based on OCR output) in one or more standard fields of the plurality of standard fields in the first document with data in corresponding standard fields in the second document. At step 308, a determination may be made as to whether data in one or more fields match.

If, at step 308, one or more fields do not match, the first document may be flagged as likely not a duplicate in step 310. In some examples, this may be sufficient identify the first document as not a duplicate and the document may be further processed (e.g., if the document is a check, the check may be deposited, cashed, or the like). In other examples, at step 312, a confidence rating may be received and compared to a predetermined threshold to determine whether the confidence rating is above the predetermined threshold. In some examples, the confidence rating may be a rating of confidence in accuracy of the data output via OCR from the first document.

If, at step 312, the confidence rating is above the predetermined threshold, the document may be identified as not a duplicate and may be processed at step 316. If, at step 312, the confidence rating is not above the predetermined threshold, the first document may be flagged for further evaluation at step 314. In some examples, further evaluation may include a manual review of the first document.

At step 318, a determination may be made as to whether there are additional documents to be compared to the first document to determine whether the first document is a duplicate of another document. If not, the process may end. If so, the process may return to step 304 to identify another document for comparison.

Returning to step 308, if one or more standard fields do match, the document may be considered a potential duplicate and a pixel location of data in one or more standard fields may be identified at step 320. For instance, x and y coordinates of one or more pixels in data in one or more standard fields in the first document may be identified (e.g., via OCR). In some examples, the pixel may be a pixel near an edge or starting point of data input into the standard field. In another example, the pixel may be an ending portion of the data. In still other examples, the pixel may be in a central portion or other portion of the data.

At step 322, a location corresponding to the x and y coordinates on the second document may be identified. For instance, the x and y coordinates identified from the first document may be used to identify a corresponding location on the second document.

At step 324, a determination may be made as to whether data at the location of the x and y coordinates in the first document matches data at the corresponding location on the second document. If not, the document may be flagged as likely not a duplicate and the process may proceed to step 310.

If, at step 324, the data at the locations does match, the process may continue at step 326 in FIG. 3B. For instance, if the data does match, at step 326, the first document may be removed from processing. For instance, if the first document is a check, the check will not be cashed or deposited. At step 328, a notification may be generated indicating that the first document is a duplicate document and that it will not be processed. At step 330, the generated notification may be transmitted to a remote user computing device 170, 175 and displayed thereon.

At step 332, a determination may be made as to whether additional documents are available for comparison to the first document. If not, the process may end. If so, the process may return to step 304. In some examples, step 332 may be omitted.

FIG. 4 illustrates one example document in accordance with one or more aspects described herein. The document shown in FIG. 4 is a check 400. The check 400 includes a plurality of standard fields that are standard to the type of document (e.g., a check). For instance, the check 400 includes a date field 402, an amount field 404, a payee field 406, and a memo field 408. Additional standard fields may be provided without departing from the invention.

FIGS. 5A and 5B illustrate example checks be compared to determine whether the first check is a duplicate of the second check in accordance with one or more aspects described herein. For instance, FIG. 5A illustrates a first document 500. The first document 500 may be a check having a plurality of standard fields. FIG. 5B illustrates a second document 550 to which the first document 500 may be compared. The second document 550 may also be a check. As shown in FIGS. 5A and 5B, data in standard fields, such as those identified with respect to FIG. 4, are substantially similar or the same in both check 500 and check 550. Accordingly, as discussed herein, the duplicate detection computing platform 110 may use optical character recognition (OCR) to determine x and y coordinates of a location of data in the first document. For instance, box 510 indicates a location of data in the first document 500. In the example shown, the data is the payee name and the location is a starting edge of the data input into the field.

The system may then use the x and y coordinates to identify a corresponding location on the second document 550. Box 560 illustrates the corresponding location on the second document 550. As shown in FIGS. 5A and 5B, the data within the box 510 does not match the data within the box 560. Accordingly, the first document would be identified as not a duplicate of the second document.

In some examples, the process may be repeated by identifying coordinates of locations of other data in the same or different standard fields, identifying a corresponding location on a second or other document for comparison and comparing the data. This may be used to further improve the accuracy of identifying duplicate items.

As discussed herein, arrangements provide for accurate and efficient evaluation of documents, items, instruments and the like, including documents for deposit, such as checks, to ensure that a received document is not a duplicate of another, previously processed document. As discussed above, a duplicate detection computing platform may receive a document, document image, document details, or the like, and may perform optical character recognition on the document to identify data in one or more standard fields within the document. In some examples, the data in the standard fields may be compared to data in corresponding fields on one or more other documents. For instance, the received document may be compared to all documents received by the duplicate detection computing platform in a predetermined time period. If data does not match, the received document may be identified as an original, non-duplicate document and may be processed. If data does match, additional processing may be performed including using optical character recognition to identify x and y coordinates of a pixel corresponding to data in one or more standard fields on the received document. The x and y coordinates may be used to locate a corresponding location on one or more other documents and the data at the location may be compared. If the data matches, the document may be flagged as a duplicate, removed from further processing, and the like.

The arrangements discussed herein provide an immense reduction in resources required to perform processes associated with duplicate detection. Some entities receive millions or even billions of documents, items, instruments, and the like, each year. Reviewing and evaluating each document is a labor intensive process that is inefficient and, at times, inaccurate. Accordingly, the system described herein, relying on optical character recognition to not only decipher data within the document but also pinpoint data at exact locations (e.g., at a pixel level) for comparison to other documents provides a fast, efficient, accurate method of evaluating each document.

The arrangements described herein are particularly advantageous when considering that documents are received via a plurality of different channels. For instance, in the case of a check, a check may be received for deposit, cashing, or the like, via an ATM or self-service kiosk, via a banking center associate, via an application executing on a mobile device of a user, and the like. Receiving documents via these various different channels leads to inaccuracies in detecting duplicates in conventional systems because there is no central location storing all documents, comparing all documents, and the like. Accordingly, the arrangements described herein ensure that documents are evaluated for potential duplicates regardless of the channel through which the document was received.

In some examples, aspects described herein may be performed in real-time or near real-time. For instance, a document may be received and may be analyzed in real-time to determine whether the document will be further processed or removed from processing. Accordingly, notifications that document are removed from processing as duplicates may be transmitted to a user in real-time or near real-time to provide efficient and accurate service.

Figure 6:
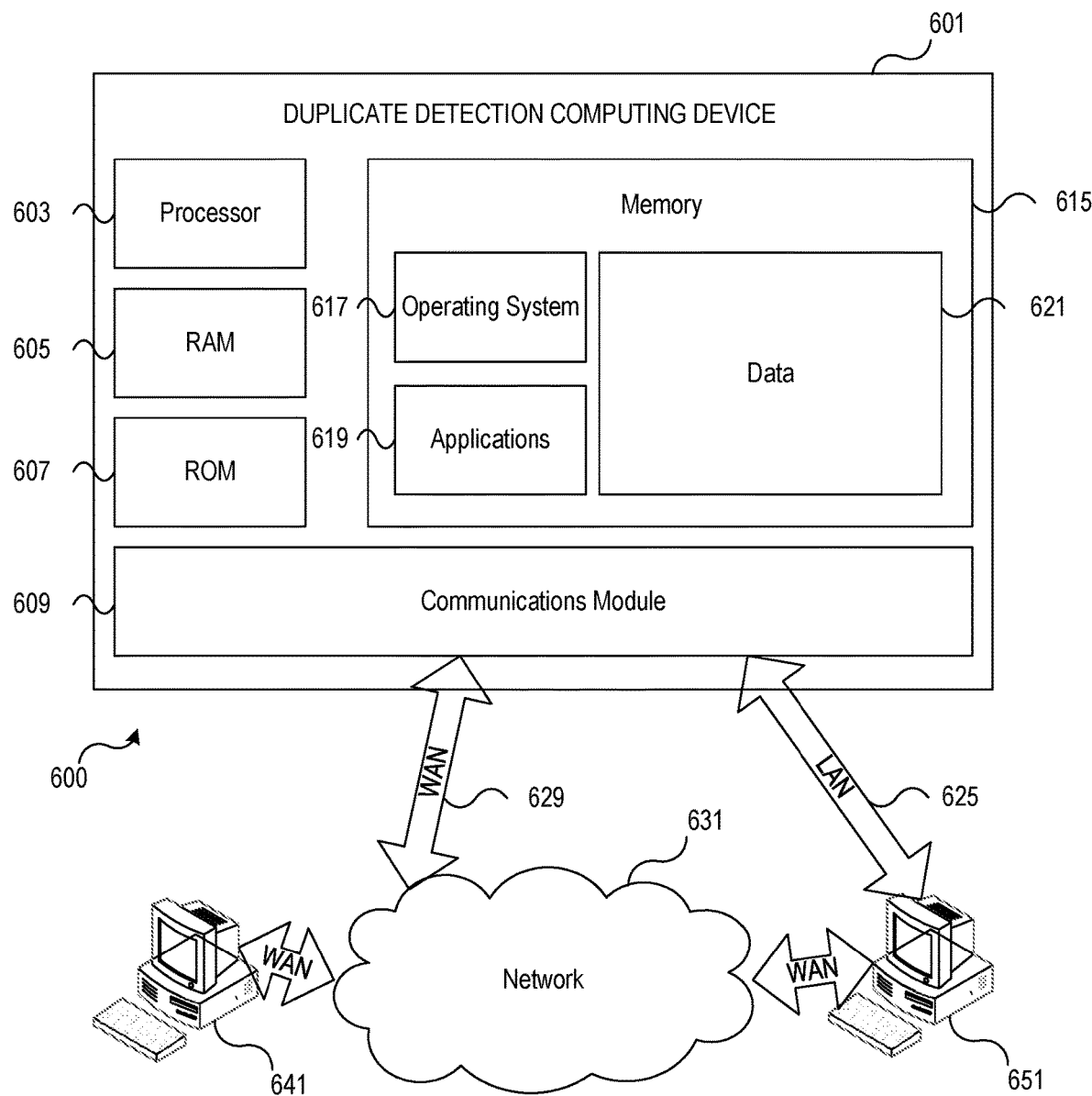
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include duplicate detection computing device 601 having processor 603 for controlling overall operation of duplicate detection computing device 601 and its associated components, including Random Access Memory (RAM) 605, Read-Only Memory (ROM) 607, communications module 609, and memory 615. Duplicate detection computing device 601 may include a variety of computer readable media. Computer readable media may be any available media that may be accessed by duplicate detection computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on duplicate detection computing device 601. Such a processor may execute computer-executable instructions stored on a computer-readable medium.

Software may be stored within memory 615 and/or storage to provide instructions to processor 603 for enabling duplicate detection computing device 601 to perform various functions as discussed herein. For example, memory 615 may store software used by duplicate detection computing device 601, such as operating system 617, application programs 619, and associated database 621. Also, some or all of the computer executable instructions for duplicate detection computing device 601 may be embodied in hardware or firmware. Although not shown, RAM 605 may include one or more applications representing the application data stored in RAM 605 while duplicate detection computing device 601 is on and corresponding software applications (e.g., software tasks) are running on duplicate detection computing device 601.

Communications module 609 may include a microphone, keypad, touch screen, and/or stylus through which a user of duplicate detection computing device 601 may provide input, and may also include one or more of a speaker for providing audio output and a video display device for providing textual, audiovisual and/or graphical output. Computing system environment 600 may also include optical scanners (not shown).

Duplicate detection computing device 601 may operate in a networked environment supporting connections to one or more remote computing devices, such as computing devices 641 and 651. Computing devices 641 and 651 may be personal computing devices or servers that include any or all of the elements described above relative to dynamic event processing computing device 601.

The network connections depicted in FIG. 6 may include Local Area Network (LAN) 625 and Wide Area Network (WAN) 629, as well as other networks. When used in a LAN networking environment, duplicate detection computing device 601 may be connected to LAN 625 through a network interface or adapter in communications module 609. When used in a WAN networking environment, duplicate detection computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 7:
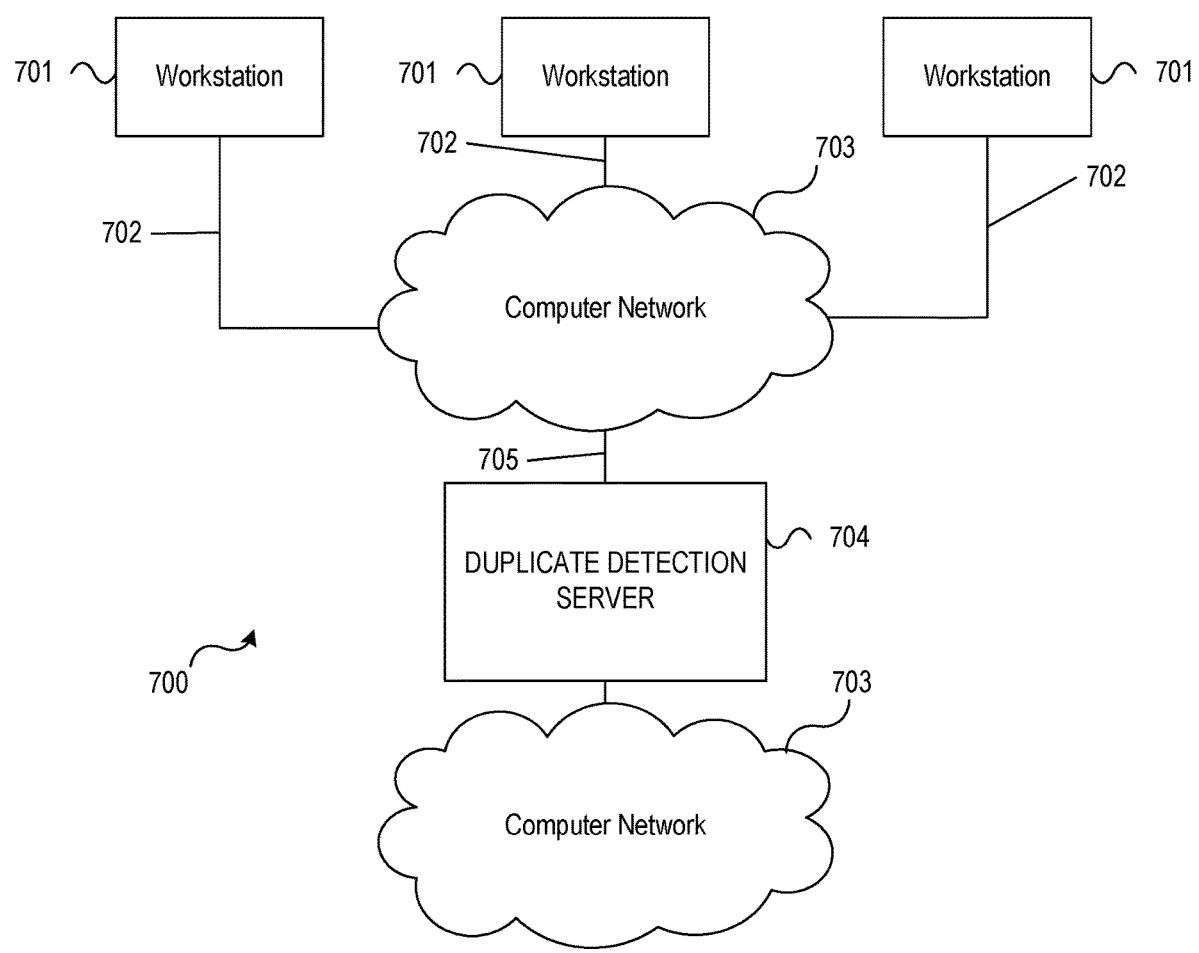
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to duplicate detection server 704. In system 700, duplicate detection server 704 may be a server, processor, computer, or data processing device, or combination of the same, configured to perform the functions and/or processes described herein. Server 704 may be used to receive documents or document image data, perform optical character recognition, compare data in standard fields, identify x and y coordinates of data in one or more locations on a document, identify a corresponding location on a second document, determine whether the first document is a duplicate of the second document, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and duplicate detection server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A duplicate detection computing platform, comprising:
at least one processor;
a communication interface communicatively coupled to the at least one processor; and
memory storing computer-readable instructions that, when executed by the at least one processor, cause the duplicate detection computing platform to:
receive a first document for processing, the first document received via a first channel and having a first document type and including a first plurality of standard fields corresponding to the first document type;
compare the first document to a plurality of other documents received via a plurality of channels including at least the first channel and a second channel different from the first channel, to generate a preliminary determination of whether the first document is a duplicate of at least a second document of the plurality of other documents, wherein the plurality of other documents includes all documents having the first document type received within a predetermined time period;
responsive to generating the preliminary determination that the first document is a duplicate of the at least a second document, further compare the first document to the at least a second document to generate a secondary determination of whether the received first document is a duplicate of the at least a second document, the further comparing including:
using optical character recognition to identify data in each standard field of the first plurality of standard fields within the first document;
identifying, based on the optical character recognition, x and y coordinates of a portion of the identified data in a first standard field of the first plurality of standard fields within the first document, wherein the x and y coordinates correspond to a starting point of data input into the first standard field by a user;
identifying, based on the identified x and y coordinates, a location on the at least a second document corresponding to the x and y coordinates identified for the portion of the identified data in the first standard field of the first plurality of standard fields; and
comparing the portion of the identified data in the first standard field of the first plurality of standard fields to data in the location on the at least a second document corresponding to the x and y coordinates to determine whether a match exists between the portion of the identified data in the first standard field of the first plurality of standard fields and the data in the location on the at least a second document corresponding to the x and y coordinates;
responsive to determining that a match exists between the portion of the identified data in the first standard field of the plurality of standard fields and the data in the location on the at least a second document corresponding to the x and y coordinates, flagging the first document as a duplicate and automatically removing the first document from further processing; and responsive to determining that a match between the portion of the identified data in the first standard field of the first plurality of standard fields and the data in the location on the at least a second document corresponding to the x and y coordinates does not exist, further processing the first document.

2. The duplicate detection computing platform of claim 1, wherein the first document type is a check and the first plurality of standard fields includes standard fields associated with the check.

3. The duplicate detection computing platform of claim 2, wherein the first plurality of standard fields includes at least two of: payee name, amount, date, signature, and memo.

4. The duplicate detection computing platform of claim 1, wherein comparing the first document to the at least a second document further includes:

prior to identifying the x and y coordinates of the portion of the identified data in the first standard field:

comparing the data in each standard field of the first plurality of standard fields in the first document to data in each standard field of a second plurality of standard fields in the at least a second document;

determining, based on the comparing the data in each standard field of the first plurality of standard fields in the first document to data in each standard field of the second plurality of standard fields in the at least a second document, whether data in one or more standard fields of the first plurality of standard fields in the first document matches data in one or more standard fields of the second plurality of standard fields in the second document;

responsive to determining that the data in one or more standard fields of the first plurality of standard fields in the first document does not match the data in one or more standard fields of the second plurality of standard fields in the second document, determining that the first document is not a duplicate of the at least a second document; and responsive to determining that the data in one or more standard fields of the first plurality of standard fields in the first document does match the data in one or more standard fields of the second plurality of standard fields in the second document, determining that the first document is a potential duplicate of the at least a second document and proceeding to identify the x and y coordinates of the portion of the identified data in the first standard field of the first plurality of standard fields.

5. The duplicate detection computing platform of claim 4, wherein determining that the first document is not a duplicate of the at least a second document further includes:

receiving a confidence rating indicating a confidence in an accuracy of quality of data in the first document;

determining whether the confidence rating is above a predetermined threshold;

responsive to determining that the confidence rating is above the predetermined threshold, determining that the first document is not a duplicate; and responsive to determining that the confidence rating is not above the predetermined threshold, flagging the first document for additional review.

6. The duplicate detection computing platform of claim 1, wherein the first document type is a check and further processing the first document includes at least one of: cashing the check and depositing the check.

7. The duplicate detection computing platform of claim 1, wherein the x and y coordinates correspond to a pixel location of the starting point of the data input in the first standard field of the first plurality of standard fields.

8. A method, comprising:

at a computing platform comprising at least one processor, memory, and a communication interface:

receiving, by the at least one processor and via the communication interface, a first document for processing, the first document received via a first channel and having a first document type and including a first plurality of standard fields corresponding to the first document type;

comparing, by the at least one processor, the first document to a plurality of other documents received via a plurality of channels including at least the first channel and a second channel different from the first channel to generate a preliminary determination of whether the first document is a duplicate of at least a second document of the plurality of other documents, wherein the plurality of other documents includes all documents having the first document type received within a predetermined time period;

responsive to generating the preliminary determination that the first document is a duplicate of the at least a second document, further comparing, by the at least one processor, the first document to the at least a second document to generate a secondary determination of whether the received first document is a duplicate of the at least a second document, the further comparing including:

using optical character recognition, identifying, by the at least one processor, data in each standard field of the first plurality of standard fields within the first document;

identifying, by the at least one processor and based on the optical character recognition, x and y coordinates of a portion of the identified data in a first standard field of the first plurality of standard fields within the first document, wherein the x and y coordinates correspond to a starting point of data input into the first standard field by a user;

identifying, by the at least one processor and based on the identified x and y coordinates, a location on the at least a second document corresponding to the x and y coordinates identified for the portion of the data in the first standard field of the first plurality of standard fields; and comparing, by the at least one processor, the portion of the identified data in the first standard field of the first plurality of standard fields to data in the location on the at least a second document corresponding to the x and y coordinates to determine whether a match exists between the portion of the identified data in the first standard field of the first plurality of standard fields and the data in the location on the at least a second document corresponding to the x and y coordinates;

responsive to determining that a match exists between the portion of the identified data in the first standard field of the plurality of standard fields and the data in the location on the at least a second document corresponding to the x and y coordinates, flagging, by the at least one processor, the first document as a duplicate and automatically removing the first document from further processing; and responsive to determining that a match between the portion of the identified data in the first standard field of the plurality of standard fields and the data in the location on the at least a second document corresponding to the x and y coordinates does not exist, further processing the first document.

9. The method of claim 8, wherein the first document type is a check and the first plurality of standard fields includes standard fields associated with the check.

10. The method of claim 9, wherein the first plurality of standard fields includes at least two of: payee name, amount, date, signature, and memo.

11. The method of claim 8, wherein comparing the first document to the at least a second document further includes:

prior to identifying the x and y coordinates of the portion of the identified data in the first standard field:

comparing, by the at least one processor, data in each standard field of the first plurality of standard fields in the first document to data in each standard field of a second plurality of standard fields in the at least a second document;

determining, by the at least one processor and based on the comparing the data in each standard field of the first plurality of standard fields in the first document to data in each standard field of the second plurality of standard fields in the at least a second document, whether data in one or more standard fields of the first plurality of standard fields in the first document matches data in one or more standard fields of the second plurality of standard fields in the second document;

responsive to determining that the data one or more standard fields of the first plurality of standard fields in the first document does not match the data in one or more standard fields of the second plurality of standard fields in the second document, determining, by the at least one processor, that the first document is not a duplicate of the at least a second document; and responsive to determining that the data in one or more standard fields of the first plurality of standard fields in the first document does match the data in one or more standard fields of the second plurality of standard fields in the second document, determining, by the at least one processor, that the first document is a potential duplicate of the at least a second document and proceeding to identify the x and y coordinates of the portion of the identified data in the first standard field of the first plurality of standard fields.

12. The method of claim 11, wherein determining that the first document is not a duplicate of the at least a second document further includes:

receiving, by the at least one processor, a confidence rating indicating a confidence in an accuracy of quality of data in the first document;

determining, by the at least one processor, whether the confidence rating is above a predetermined threshold;

responsive to determining that the confidence rating is above the predetermined threshold, determining, by the at least one processor, that the first document is not a duplicate; and responsive to determining that the confidence rating is not above the predetermined threshold, flagging, by the at least one processor, the first document for additional review.

13. The method of claim 8, wherein the first document type is a check and further processing the first document includes at least one of: cashing the check and depositing the check.

14. The method of claim 8, wherein the x and y coordinates correspond to a pixel location of the portion starting point of the identified data inputdata in the first standard field of the first plurality of standard fields.

15. One or more non-transitory computer-readable media storing instructions that, when executed by a computing platform comprising at least one processor, memory, and a communication interface, cause the computing platform to:

receive a first document for processing, the first document received via a first channel and having a first document type and including a first plurality of standard fields corresponding to the first document type;

compare the first document to a plurality of other documents received via a plurality of channels including at least the first channel and a second channel different from the first channel to generate a preliminary determination of whether the first document is a duplicate of at least a second document of the plurality of other documents, wherein the plurality of other documents includes all documents having the first document type received within a predetermined time period;

responsive to generating the preliminary determination that the first document is a duplicate of the at least a second document, further compare the first document to the at least a second document to generate a secondary determination of whether the received first document is a duplicate of the at least a second document, the further comparing including:

using optical character recognition to identify data in each standard field of the first plurality of standard fields within the first document;

identifying, based on the optical character recognition, x and y coordinates of a portion of the identified data in a first standard field of the first plurality of standard fields within the first document, wherein the x and y coordinates correspond to a starting point of data input into the first standard field by a user;

identifying, based on the identified x and y coordinates, a location on the at least a second document corresponding to the x and y coordinates identified for the portion of the identified data in the first standard field of the first plurality of standard fields; and comparing the portion of the identified data in the first standard field of the first plurality of standard fields to data in the location on the at least a second document corresponding to the x and y coordinates to determine whether a match exists between the portion of the identified data in the first standard field of the first plurality of standard fields and the data in the location on the at least a second document corresponding to the x and y coordinates;

responsive to determining that a match exists between the portion of the identified data in the first standard field of the first plurality of standard fields and the data in the location on the at least a second document corresponding to the x and y coordinates, flagging the first document as a duplicate and automatically removing the first document from further processing; and responsive to determining that a match between the portion of the identified data in the first standard field of the first plurality of standard fields and the data in the location on the at least a second document corresponding to the x and y coordinates does not exist, further processing the first document.

16. The one or more non-transitory computer-readable media of claim 15, wherein the first document type is a check and the plurality of standard fields includes standard fields associated with the check.

17. The one or more non-transitory computer-readable media of claim 16, wherein the first plurality of standard fields includes at least two of: payee name, amount, date, signature, and memo.

18. The one or more non-transitory computer-readable media of claim 15, wherein comparing the first document to the at least a second document further includes:
prior to identifying the x and y coordinates of the portion of the identified data in the first standard field:
comparing the data in each standard field of the first plurality of standard fields in the first document to data in each standard field of a second plurality of standard fields in the at least a second document;
determining, based on the comparing the data in each standard field of the first plurality of standard fields in the first document to data in each standard field of the second plurality of standard fields in the at least a second document, whether data in one or more standard fields of the first plurality of standard fields in the first document matches data in one or more standard fields of the second plurality of standard fields in the second document;
responsive to determining that the data in one or more standard fields of the first plurality of standard fields in the first document does not match the data in one or more standard fields of the second plurality of standard fields in the second document, determining that the first document is not a duplicate of the at least a second document; and
responsive to determining that the data in one or more standard fields of the first plurality of standard fields in the first document does match the data in one or more standard fields of the second plurality of standard fields in the second document, determining that the first document is a potential duplicate of the at least a second document and proceeding to identify the x and y coordinates of the portion of the identified data in the first standard field of the first plurality of standard fields.

19. The one or more non-transitory computer-readable media of claim 18, wherein determining that the first document is not a duplicate of the at least a second document further includes:
receiving a confidence rating indicating a confidence in an accuracy of quality of data in the first document;
determining whether the confidence rating is above a predetermined threshold;
responsive to determining that the confidence rating is above the predetermined threshold, determining that the first document is not a duplicate; and
responsive to determining that the confidence rating is not above the predetermined threshold, flagging the first document for additional review.

20. The one or more non-transitory computer-readable media of claim 15, wherein the first document type is a check and further processing the first document includes at least one of: cashing the check and depositing the check.

21. The one or more non-transitory computer-readable media of claim 15, wherein the x and y coordinates correspond to a pixel location of the starting point of the data input in the first standard field of the first plurality of standard fields.

* * * * *

UNITED STATES PATENT AND TRADEMARK OFFICE
CERTIFICATE OF CORRECTION

PATENT NO. : 10,726,254 B2  
APPLICATION NO. : 15/923094  
DATED : July 28, 2020  
INVENTOR(S) : Pepe, Jr. et al.

Page 1 of 1

It is certified that error appears in the above-identified patent and that said Letters Patent is hereby corrected as shown below:

In the Claims

Column 20, Line 6:  
In Claim 14, before "starting", delete "portion"

Column 20, Line 7:  
In Claim 14, after "point of the", delete "identified"

Column 20, Line 7:  
In Claim 14, delete "inputdata" and insert --input--

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*